United States Patent [19]

Meiller et al.

[11] Patent Number: 4,471,934
[45] Date of Patent: Sep. 18, 1984

[54] DRIVER'S SEAT

[75] Inventors: Hermann Meiller, Amberg; Leonhardt Goetz, Kuemmersbruck, both of Fed. Rep. of Germany

[73] Assignee: Willibald Grammer, Amberg, Fed. Rep. of Germany

[21] Appl. No.: 319,386

[22] Filed: Nov. 9, 1981

[30] Foreign Application Priority Data

Nov. 12, 1980 [DE] Fed. Rep. of Germany ....... 3042604

[51] Int. Cl.³ .............................................. A47C 7/35
[52] U.S. Cl. ..................................... 248/575; 267/177
[58] Field of Search .............. 248/575, 631, 562, 577; 297/307; 267/177, 175

[56] References Cited

U.S. PATENT DOCUMENTS

| 3,599,232 | 8/1971 | Tabor | 248/575 |
| 3,874,626 | 4/1975 | Gross | 248/562 |
| 3,917,209 | 11/1975 | Adams | 248/575 |
| 4,103,858 | 8/1978 | Swenson | 248/576 |
| 4,148,518 | 4/1979 | Vilbeuf | 248/631 |

FOREIGN PATENT DOCUMENTS

| 782870 | 4/1968 | Canada | 248/575 |
| 2625508 | 12/1977 | Fed. Rep. of Germany | 248/575 |
| 2041217 | 1/1980 | United Kingdom | 248/575 |

Primary Examiner—Reinaldo P. Machado
Assistant Examiner—Alvin Chin-Shue
Attorney, Agent, or Firm—Louis E. Marn

[57] ABSTRACT

A driver's seat for tractors or the like has a system such as crossing levers or a parallelogram for keeping it horizontal on changes in level, which take place when a spring under the seat is compressed. For making possible adjustment to different weights of drivers without changing the natural frequency of the springing motion upwards and downwards of the seat, the spring has two runners acting on cams on the levers of the system so that, when the spring is moved in relation to the cams, the leverage of the spring by way of the levers on the top part of the seat is changed. Such horizontal motion of the spring is produced by a carriage pushed backwards and forwards by a threaded rod with a handwheel.

6 Claims, 2 Drawing Figures

DRIVER'S SEAT

BACKGROUND OF THE INVENTION

The present invention is with respect to a driver seat, more specially for tractors and other vehicles under the control of a driver, having an upper chair-like part with a seat plate and a backrest and which is guided in relation to a support or base-frame by way of a system with crossing levers so that the upper chair part is guided on being moved vertically, its weight being supported on the base-frame by way of a spring acting in the direction of motion of the crossing lever system, and the point at which the spring takes effect on the crossing lever system may be changed by an adjustment system for different weights of drivers.

Driver's seats have to be able to undergo adjustment because of different weights of drivers using them, the general purpose being to see that for all drivers the distance moved against the spring or the range of spring effect is kept at the same value for all drivers, that is to say in a wide driver weight range. In the prior art this has generally simply been done by changing the pre-loading effect on the spring. The outcome of this, however, is that, when the seat is used by a driver who is on the heavy side, there is an undesired bouncing effect against the stops limiting motion of the seat. What would seem necessary in this respect would seem to be a seat design which makes it possible to get such an adjustment that for different driver weights in a given range (that is to say independently of the weight of a driver using the seat at a given time) that the inherent or natural frequency of the seat is kept at the same value, the natural frequency being given by the formula $$f = 1/(2\pi)\sqrt{(c/m)}$$

wherein
f = natural frequency (sec.$^{-1}$)
c = seat constant (N/m)
m = mass (measured in kilograms).

The seat constant is generally dependent on the acting spring force. If, for adjustment of the seat to different weights of driver, only the spring pre-load is changed, there will generally only be a small change in the seat constant, or, at any rate, such change will not keep in step with the change in the weight of the drivers, the driver's weight counting as part of the mass m of the seat.

GENERAL OUTLINE OF THE INVENTION

One purpose of the present invention is that of so designing a driver's seat that the theoretical natural frequency f of the seat may be kept at the same value as far as possible; that is to say on adjustment of the seat, to be in line with a different mass m, the seat constant c is changed as well.

For effecting this purpose in the present invention in the case of a driver's seat of the sort noted at the start, the point at which the spring takes effect on the crossing lever system may be moved along a cam fixedly positioned on at least one crossing lever and the form of the cam is so designed that, on changing the position at which the spring takes effect along the cam at the same time the pre-load of the spring and the length of the lever arm, responsible for fixing the force acting on the spring when the seat is being used, are so changed that the theoretical inherent or natural frequency of the seat may be kept at generally the same value for different weights of drivers, that is to say independently of the driver's weight.

For this reason, in the case of the seat of the present invention, on adjustment to different driver weights there is not only a change in the spring pre-load, as has been the case with the prior art, but at the same time there is an adjustment or change in the lever arm or leverage by way of which the weight of the seat-cum-driver takes effect on the spring, in which respect making the acting lever arm shorter is responsible for a decrease in the spring pre-load. On these lines the relation between the seat constant c and the mass m as in the said formula, may be kept generally unchanged quite readily. The outcome of this is that the properties of the seat, and more specially its natural or inherent frequency and, furthermore, generally the possible motion against the spring are kept more or less the same for changing weights of drivers, that is to say independently of the weight of the driver. This makes for a marked step forward in design from seats so far known in the art.

The seat spring system may be a simply designed, if the spring is in the form of a coiled or helical spring, and more specially a tapered spring, whose end with the greater diameter takes effect on the cam and which, for changing the position at which it takes effect on the cam, may be moved in a direction normal to its line of action (middle axis). Such a coiled spring may readily be housed within the frame of the seat without taking up much space. In this respect, a specially useful effect is produced inasfar as for changing the acting lever arm, the point of acting normally has to be moved parallel to the seat plate of the seat, that is to say it is no longer necessary to have screw-threaded rods, as used so far in the art, for changing the pre-load of the coiled spring. The outcome of this is that the overall height of the seat system is very low.

For changing the point of action of the coiled spring on the cam, it is simply possible for one end of the coiled spring to be fixed to a carriage which may be moved by way of a driving system in a direction normal to the line of action of the coiled spring, the carriage having a guide for the free, other end of the coiled spring, at which the point of acting on the cam is positioned, so that the coiled spring may be forced together. In the case of such a design only a small number of parts is necessary and furthermore it is no trouble to have the carriage within the crossing lever system of the seat so that the system may be made small in size in any case.

The guide may simply be in the form of a cover placed over and round the free end of the coiled spring and which, by way of links, is joined up with the carriage so that its motion will generally be in line with the line of action of the coiled spring. In the case of such a design a useful effect is produced if, as is normal, the crossing lever system has two pairs of crossing levers, each made up of two parallel levers and, in view of this design, two cams are present on the two sides of the coiled spring, such cams being acted upon by two runners on an axis which is normal to the line of action of the coiled spring and normal to the cams, the runners being acted upon by the coiled spring. The points of action of the coiled spring on the crossing lever system are then at the runners. Because the runners are on the cover and the cover is generally only able to be moved in the line of action because of the links, it is possible to make certain, in a very simple way, that the acting length of lever arms is kept at the same value without being dependent on the degree to which the seat has been pushed down against the spring.

The runners or sliding parts are best in the form of small wheels for cutting down unnecessary friction. Furthermore, the design may be made simpler if, as part of a further teaching of the invention, the runners are coaxial to the axis at which the links are turningly joined with the spring cover.

Lastly, as part of a further teaching of the invention, for changing the position of the coiled spring, a threaded rod may be used. Such a rod driving system may be very simple in design as well, because no change in direction in the line of motion is necessary. To take an example, the threaded rod of the rod driving system may be run into a sleeve on the carriage itself, while its other end is joined up with the frame of the seat so that it may not be moved in its lengthways direction.

DETAILED ACCOUNT OF WORKING EXAMPLE OF THE INVENTION

Further details, developments and useful effects of the invention will be seen from the account now to be given of one preferred working example using the figures.

Figure 1:
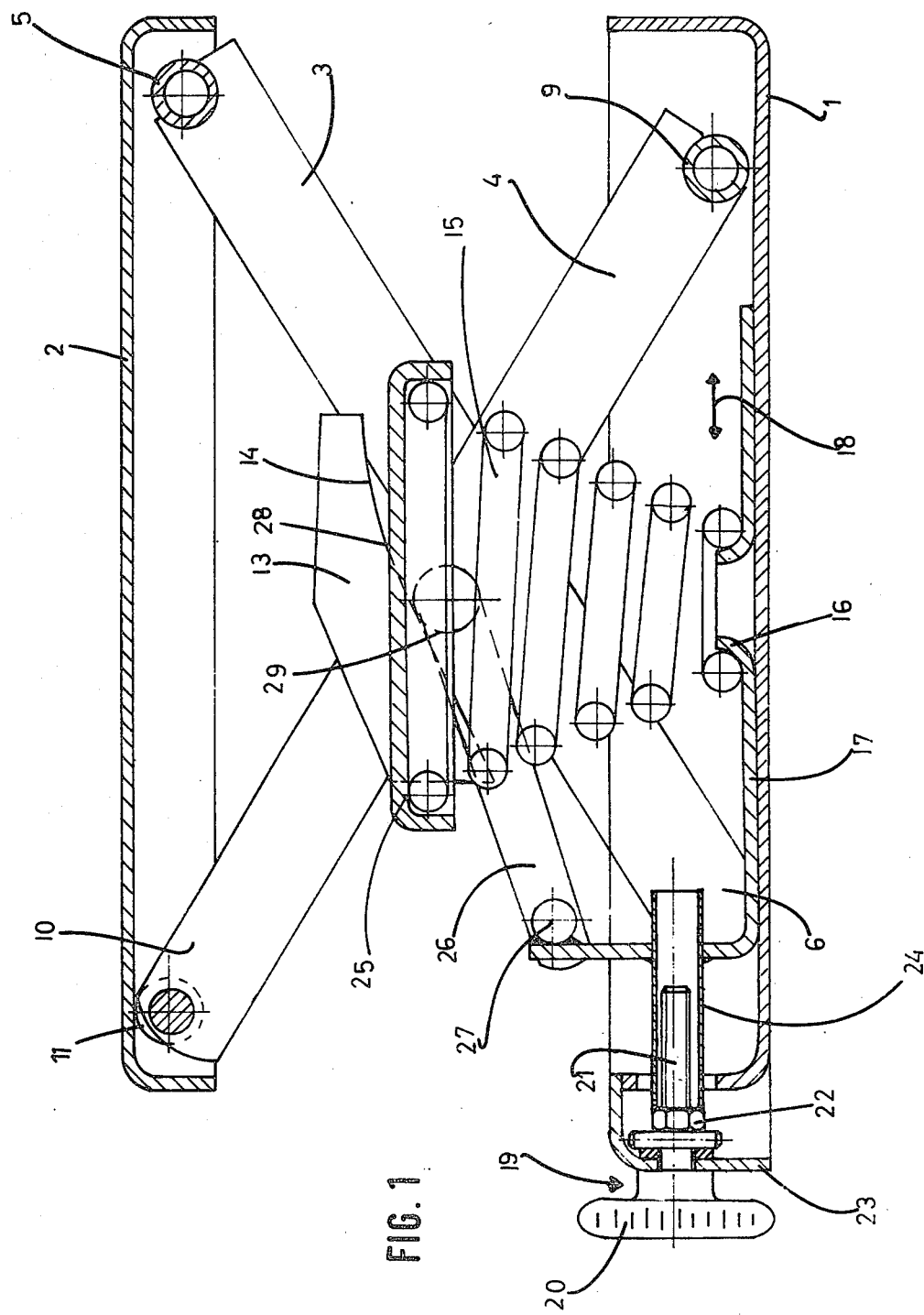
FIG. 1 is a vertical section through the frame of a driver's seat of the present invention.

The seat frame may be seen, as made more specially clear by FIG. 1, to have a base-plate 1 which, for example is fixed to the floor of the vehicle, and a seat plate 2, which is used for supporting the top, chair-like part of the seat made up of a seat plate or cushion and a backrest. Between the base-plate 1 and the seat plate 2, there is a crossing lever system made up of two pairs of scissorwise crossing levers 3 and 4. The two crossing levers 3 or links are turningly joined by way of a rod 5 with the seat plate 2 so that the levers may be moved vertically. The lower ends 6 of levers 3 are supported by way of small wheels 7, not to be seen in FIG. 1, on base-plate 1. Small wheels 7 may be moved within a housing 8 having stops for wheels 7 at its two ends. In this way, vertical motion of seat plate 2 in relation to base-plate 1 is limited.

The crossing, scissors-like levers 4 or links are, as well, joined up with a common rod 9 or shaft so that they may be turned in relation to the base-plate 1. Their free top ends 10 have small wheels 11, which, in the present working example to be seen, are seated on a common rod, the lower face of seat plate 2 resting on the top ends 10 of the levers by way of wheels 11.

Figure 2:
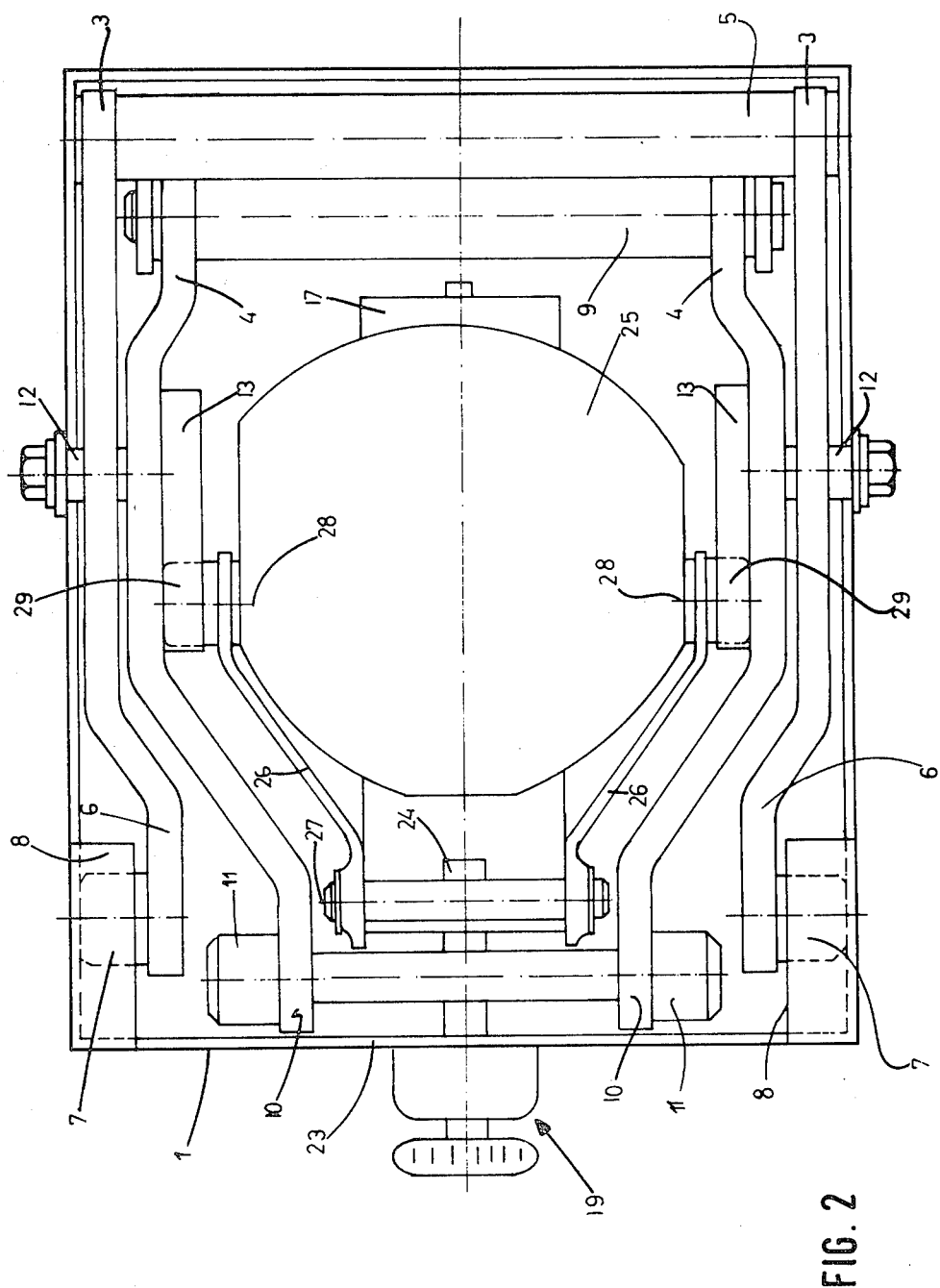
FIG. 2 is a view looking down onto the seat frame, the seat plate having been taken off.

The two crossing levers 3 and 4 are, in each case, joined up by way of a turnpin 12 (see FIG. 2) so that they may be moved in relation to each other.

Generally at the middle of levers 4 there is a cam 13, which is fixed on, for example by welding, the cam's acting face being a downwardly facing ramp curve 14 stretching, as may be seen from FIG. 1, at a small slope to the middle plane between and plane parallel to the base-plate 1 and the seat plate 2. The form of the ramp curve 14 may be changed in design to be in line with the sort of tapered coiled spring 15 used for supporting the seat, as will be made clear later on.

The tapered coiled spring 15 is so supported in the seat of the present invention that it may be moved and changed in position in a direction parallel to the base-plate 1 and the seat plate 2, that is to say generally normal to its line of action. For doing this, the lower, inner end of the tapered spring 15 is locked on an upwardly running, generally round head 16 on carriage 17. Carriage 17 may be moved on the base-plate 1 in the direction of double headed arrow 18. This motion of carriage 17 is produced by a driving system 19 whose threaded driving rod 21 has a handwheel 20 and is screwed into a nut 22 fixed to carriage 17. Threaded rod 21 is locked on the end wall 23 of base-plate 1 so that, while turning is possible, it is not able to be moved in its lengthways direction. Nut 22 is fixed on a sleeve 24 which, for its part, is joined up with carriage 17, it being placed around threaded rod 21.

The top end of the tapered coiled spring with the greater diameter is taken up within a cover 25, which is so guided by way of two links 26, turningly joined at 27 with carriage 17 and at 28 with the cover, that when the tapered coiled spring 15 is being pushed together, it is only moved in a direction normal to the base-plate 1, that is to say in the direction of action of tapered spring 15. In this way, it is possible, without using a complex design, to make certain that the tapered spring 15 is kept from being pushed out sideways when loaded.

Cover 25 has two small wheels 29 or runners, which are coaxial to the axes 28 of links 26, runners 29 running up against the ramp curves 14 of the cams 13 in question. Runners 29 take the form, for this reason, of the points at which the tapered springs 15 take effect on the cams 13 and, for this reason, the points at which the force acting on the seat is handed over to the tapered spring 15. Because the cover 25 is so guided that, when the seat is pushed springingly downwards, it is only able to be moved in the direction of action of the tapered spring 15, i.e. vertically. The runners 29 are only able to be moved in the same way, this being the same as saying that the distance of the runners 29 from the rod 9 of the crossing levers 4 with the cams 13 on them, is generally kept the same. This distance between the runners 29 and the rod 9 of the crossing levers 4 is, however, generally controlling with respect to the force transmitted by the cover plate 2 and, for this reason, the top part of the seat onto the tapered spring 15. If in fact the distance between the runners 29 and the rod 9 is generally large, the spring 15 may take up higher forces, because in this case the lever arm, acting on the spring is great in relation to the overall length of the crossing lever 4. If, on the other hand, the distance between the runners 29 and the rod 9 is small, the tapered spring 15 will be acted upon by a comparatively low force when a force comes into play on the end 10 of the crossing levers 4, that is to say when there is a load on the cover plate 2 of the seat.

The form of the ramp curves 14 of the cams 13 is so designed that, on increasing the distance between the rod 9 and the runners 29, at the same time the pre-load on the tapered spring 15 will be increased. For getting an increase in the distance between the rod 9 and the runners 29, and, for this reason, a greater leverage, it is in fact necessary for carriage 17 to be moved to the left using the driving system 19, in relation to the base-plate 1. The outcome of this is that the overall tapered spring 15, together with cover 25 and, for this reason, runners 29, are moved to the left out of the position to be seen in FIG. 1. When this is done, runners 29 will be rolled along ramp curves 14 of cams 13, which, as the reader will see from the figure, are designed sloping downwards to the left. One outcome of this is that the tapered spring 15 will be forced together, because cover 25 has a tendency of moving with the runners 29 along ramp curves 14, but, on the other hand, may only be moved, generally speaking, towards the base-plate 1. If the carriage 17 is in its left hand end position, on the one hand the tapered spring 15 is more forced together than in FIG. 1, while on the other hand the distance between the rod 9 and runners 29 will have become greater. The driver's seat is then adjusted for the heaviest weight of driver.

If, on the other hand, using the driving system 19, carriage 17 is moved to the right, this will cause a parallel decrease in the distance between the rod 9 and runners 29. At the same time, the tapered spring 15 will become stretched out further, because runners 29 and, for this reason, the cover 25 as well, may be moved upwards along ramp curves 14 of cams 13.

The form of the ramp curves 14 of cams 13 has to be designed so as to take into account the properties of the special seat design in question. The design is to be such that the change, taking place at the same time, in the distance between the rod 9 and the runners 29 and in the pre-load of the spring is such that the theoretical natural frequency of the seat as worked out by the formula given at the start of this specification is kept generally the same. For this reason, it may be necessary in some cases for the slope of the ramp curves 14 to be changed to be different to that to be seen in FIG. 1 or the general form of the curve may have to be changed so as to have, for example, a number of different curve parts with more or less rounded forms in separate stretches of the curve.

Because in the seat of the present invention the spring pre-load and the supporting force are changed in step and at the same time, it is, as will be clear at once, possible without much trouble for the driving system to be marked with different driver weights, this not having been so far in the great number of cases, because exact adjustment was not possible and it was up to the driver himself to make his own adjustment to a certain degree.

It will furthermore be seen from the figures that an important useful effect of the seat of the invention is that a low overall height is possible because the guide system for the tapered spring 15 using the cover 25 and the head 16, is of such a good effect that the tapered spring may be forced together almost as far as it will go.

It is to be noted that the general teaching of the invention may be put into effect not only with seats using crossing levers as such, but furthermore in the case of all sorts of seats making such a motion of the spring possible, for example in the case of seat frames with parallelograms or turning guiding levers or the like.

We claim:

1. A driver's seat frame for tractors and like vehicles and comprised of a bottom frame mounted to said vehicle, a seat plate supported by pairs of levers of the scissors type, an end of one of said pair of levers being attached to said bottom frame with the other end thereof being slidably supported by said seat plate, one end of another one of said pair of levers being rotatably attached to said seat plate with the other end thereof slideably supported by said bottom frame, and wherein said pairs of levers are rotatably connected to one another intermediate said end, and further comprising a spring under compression adjustable by a drive mechanism, the improvement comprising:

a carriage assembly mounted for reciprocal movement on said bottom frame wherein said spring is substantially perpendicularly-disposed to and supported by said carriage member;

link means having one end pivotally mounted to said carriage;

engaging means mounted to said spring and said link means; and cam member including a cam surface mounted to one of said pair of levers of slideably receiving said engaging means, said cam surface being formed with a curve whereby movement of said engaging means on said cam surface effects compression load on said spring.

2. The driver's seat fram as defined in claim 1 wherein said spring is a coil spring and further including a cap plate for supporting said engaging means.

3. The driver's seat frame as defined in claims 1 or 2 wherein said pair of levers are parallelly disposed and wherein said cam members are mountd to one of said pair of levers.

4. The driver's seat frame as defined in claims 1 or 2 wherein said engaging means is a roller.

5. The driver's seat frame as defined in claims 1 or 2 wherein said levers are rotatably connected to one another at an axis coincident to said engaging means.

6. The driver's seat frame as defined in claims 1 or 2 wherein said spring is conically-shaped with a small portion thereof being disposed on said carriage.

* * * * *